United States Patent [19]

Manson

[11] Patent Number: 4,480,206
[45] Date of Patent: Oct. 30, 1984

[54] MOTOR HAVING STATIONARY SHAFT AND METHOD OF ASSEMBLING IT

[75] Inventor: Harry G. Manson, Princeton, Ind.

[73] Assignee: IMC Magnetics Corp., Jericho, N.Y.

[21] Appl. No.: 356,060

[22] Filed: Mar. 8, 1982

[51] Int. Cl.$^3$ .............................................. H02K 5/16
[52] U.S. Cl. ..................................... 310/90; 310/261
[58] Field of Search .................... 310/90, 75 R, 75 C, 310/261

[56] References Cited

U.S. PATENT DOCUMENTS

| 2,904,709 | 9/1959 | Lautner | 310/90 |
| 3,701,912 | 10/1972 | Schulze | 310/90 |
| 3,789,251 | 1/1974 | King | 310/90 X |

Primary Examiner—Donovan F. Duggan
Attorney, Agent, or Firm—Alan H. Levine

[57] ABSTRACT

An electric motor having a stationary shaft carrying two spaced-apart bearings rotatably supporting a rotor. The shaft has an axial bore communicating with a radial slot in the shaft. An elongated locking member extends from the bore, through the slot, and into operative engagement with one of the bearings. A plug within the bore holds the locking member in place. A collar surrounds the shaft in the region of the slot, the locking member fixing one end of the collar against said one of the bearings. A compression spring surrounding the shaft presses against both the collar and the other of the bearings. The bore merges with the slot along an inclined surface which guides one end of the elongated locking member through the slot as the locking member is advanced along the bore during assembly.

10 Claims, 3 Drawing Figures

U.S. Patent    Oct. 30, 1984    4,480,206
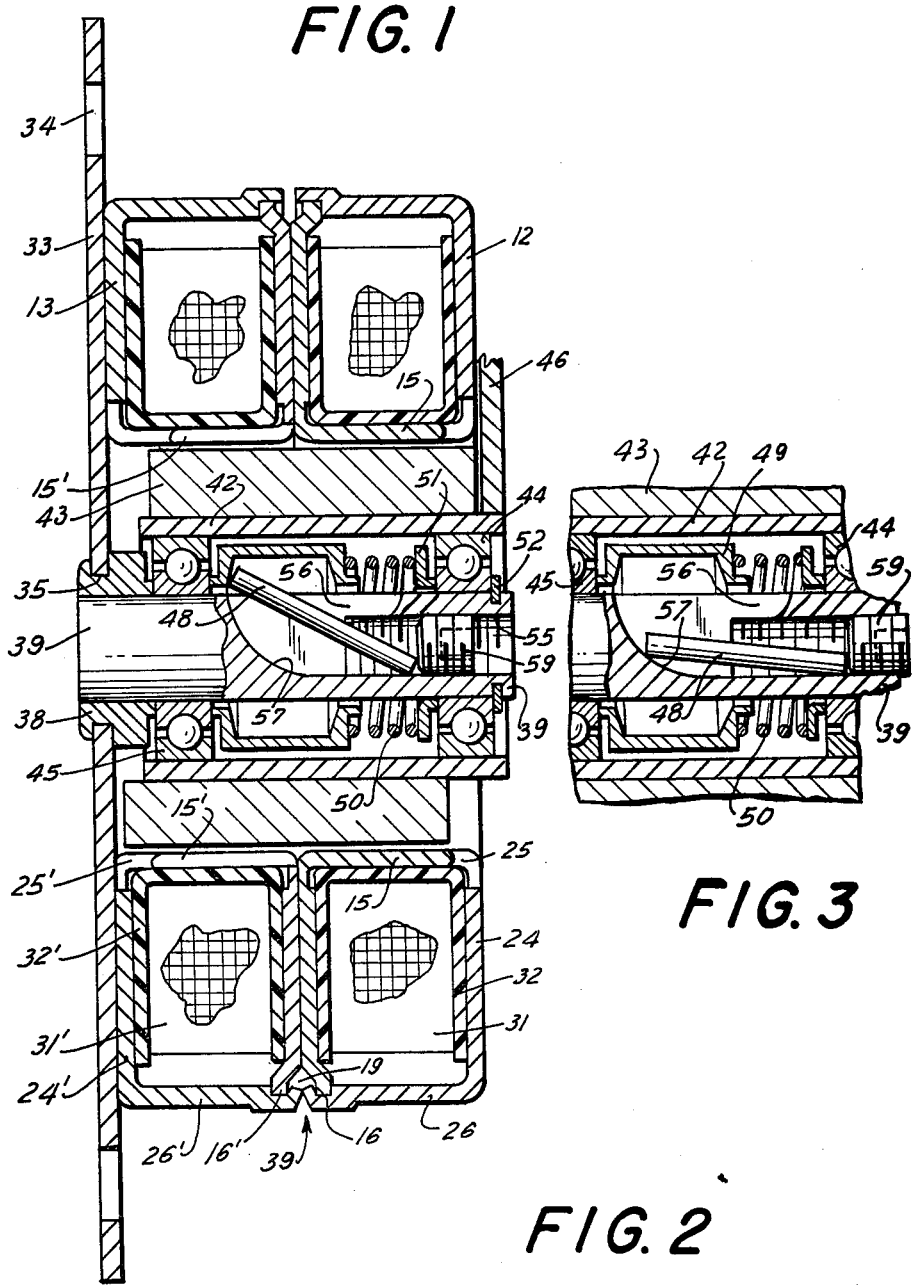
FIG. 1
FIG. 3
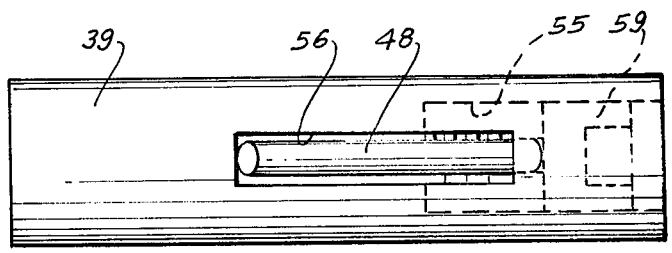
FIG. 2

MOTOR HAVING STATIONARY SHAFT AND METHOD OF ASSEMBLING IT

This invention relates to electric motors, and more particularly to motors of the type wherein the rotor of the motor is rotatably supported on a stationary shaft. Stepper motors for certain requirements are built this way, as are certain types of fan motors.

It is an object of the present invention to provide a simple and low cost way of locking one of the bearings, which rotatably support the rotor, against a stationary part of the motor, while maintaining a resilient preloading of the bearings in the longitudinal direction of the shaft.

Additional objects and features of the invention will be apparent from the following description in which reference is made to the accompanying drawings.

In the drawings:

FIG. 1 is an axial cross-sectional view of a stepper motor according to the invention;

FIG. 2 is an enlarged elevational view of the motor shaft; and

FIG. 3 is a view similar to FIG. 1 showing the motor parts in an intermediate condition of assembly.

The motor chosen to illustrate the present invention may be a stepper motor of the type shown and described in more detail in copending application Ser. No. 285,657, filed July 21, 1981. However, the invention is useful with any type of motor having a stationary shaft, such as a fan motor, wherein the rotor carries a fan impeller.

The stepper motor includes two stator plates 10 and 11, and two stator cups 12 and 13. Stator plates 10 and 11 are virtually identical, each being of annular shape. A plurality of tapered poles 15 surround the central opening of stator plate 10, the poles being circumferentially spaced apart. All the poles 15 project perpendicularly in the same direction from the plane of plate 10. The peripheral margin 16 of the plate is deformed out of the plane of the plate in the direction in which poles 15 project from the plate.

Stator plate 11 is substantially identical to plate 10, and the parts of plate 11 corresponding to those of plate 10 bear the same reference numerals employed above, followed by a prime. In order to form the inner stator member of the stepper motor, stator plates 10 and 11 are placed back-to-back and permanently fixed together, such as by welding or by a suitable adhesive.

Stator cup 12 is of annular shape, having a central opening in its back wall 24. A plurality of tapered poles 25 surround the central opening, the poles being circumferentially spaced apart. All the poles 25 project perpendicularly in the same direction from the plane of back wall 24 of the cup. A peripheral side wall 26 projects from back wall 24 in the direction in which poles 25 project from the back wall. The free edge 27 of side wall 26 is enlarged in diameter so that the internal diameter of free edge 27 is about equal to the external diameter of stator plate 10, whereby the peripheral edge 16 of plate 10 fits snugly within edge 27 of cup 12.

Stator cup 13 is substantially identical to cup 12, and the parts of cup 13 corresponding to those of cup 12 bear the same reference numerals employed above, followed by a prime. A support plate 33, having a central opening 35, is fixed, such as by welding or a suitable adhesive, to the outer face of back wall 24' of stator cup 13. Plate 33 has mounting holes 34 near its extremities, so that it can serve as a mounting plate for the stepper motor, by which the motor is secured to a stationary support.

A coil of electrical wire 31 wound on a spool 32 surrounds poles 15 and 25 of plate 10 and cup 12, respectively, and a similar coil 31' wound on a spool 32' surrounds poles 15' and 25' of plate 11 and cup 13, respectively. The free edges 27 and 27' of stator cups 12 and 13 are bent into the gap 19 between the peripheral edges 27 and 27' of stator plates 10 and 11 at a number of circumferentially spaced-apart locations along the free edges, as indicated at 39. In this way, the edges 27 and 27' are staked into the gap 19 to thereby permanently mechanically join each stator cup 12 and 13 to its respective stator plate 10 and 11.

A grommet-like bushing 38 is fixed within opening 35 in support plate 33, and one end of a shaft 39 is fixed within the bushing. Shaft 39 projects in cantelever fashion from support plate 33.

The rotor, which rotates upon energization of the stator described above, includes an annular sleeve 42 surrounding shaft 39, and a tubular permanent magnet 43 surrounding and fixed to the sleeve. Two ball bearings 44 and 45 are arranged between sleeve 42 and shaft 39 for rotatably supporting the rotor on the shaft. An element 46 to be driven by the motor is fixed to sleeve 42. This element may be an indicator of some kind, in the case of a stepper motor, or a fan impeller, in the case of a fan motor.

The inner race of bearing 45 is locked against stationary bushing 38, and hence fixed with respect to shaft 39, by an elongated locking member 48 which operatively engages the inner race of bearing 45 through one end of a collar 49 surrounding the shaft. A compression spring 50, surrounding shaft 39, is seated at one end against the end of collar 49 opposite the end which engages bearing 45. The other end of spring 50 is seated against a collar 51 which surrounds shaft 39. Collar 51 engages the inner race of bearing 44 and forces it against a snap ring 52 fixed within an annular slot at the free end of shaft 39. In this way, the inner race of bearing 44 is fixed with respect to shaft 39.

Shaft 39 is provided with an internally threaded bore 55 extending from its free end to almost mid-way of the length of the shaft. A part-circular slot 56 is formed in one surface of shaft 39 between the ends of the shaft, the slot communicating with the inner end of bore 55. The portion of slot 56 axially inwardly of bore 55 defines an inclined surface, or ramp, 57 which extends smoothly from the side of bore 55 diametrically opposite slot 56 to the outer surface of shaft 39. Slot 56 is conveniently formed by a rotating cutting tool, in which case surface 57 has the shape of a circular arc. As may be seen in FIGS. 1 and 3, collar 49 is radially aligned with the axially inner region of slot 56.

In practice, magnet 43, sleeve 42, bearings 44 and 45, collar 49, spring 50, and collar 51 are all assembled, and this assembly is slipped over shaft 39 to the position shown in FIG. 1. Snap ring 52 is then inserted into its respective groove in the shaft. Locking member 48, which is preferably a rigid pin, is then inserted lengthwise into bore 55, after which an externally threaded plug 59 is threaded into the open end of the bore (see FIG. 3). The outer face of plug 59 may be formed with a screw driver slot or, as indicated in the drawings, with a socket for accommodating an Allen wrench.

As plug 59 is screwed into bore 55, it pushes locking member 48 inwardly. As a result, the inner end of member 48 slides along inclined surface 57 (FIG. 3) and is guided thereby through slot 56 to a position radially outwardly of shaft 39 into engagement with the inner surface of collar 49 (FIG. 1). As plug 59 is further tightened, locking member 48 tightly presses one end of collar 49 against the inner race of bearing 45, as a consequence of which the inner race is tightly gripped between the collar and bushing 38. In this way, the bearing race is locked with respect to shaft 39. Spring 50 presses, through collar 51, the inner race of bearing 44 against snap ring 52, thereby locking that inner race with respect to the shaft.

It will be appreciated that the present invention offers a simple and low cost way of locking bearing 45 against the stationary support 33, 38, while providing preloading, by spring 50, of the ball bearings 44 and 45.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. An electric motor comprising:
 a stationary support,
 a shaft fixed at one end to the support and projecting in cantelever fashion therefrom, the shaft being at least partially hollow,
 an annular rotor surrounding the shaft,
 a pair of bearings between the rotor and the shaft for rotatably supporting the rotor, and
 a locking member extending from within the hollow interior of the shaft into operative engagement with one of the bearings for locking the bearing with respect to the shaft.

2. A motor as defined in claim 1 including a collar surrounding the shaft, one end of the collar engaging said one of the bearings, and the locking member engaging the collar.

3. A motor as defined in claim 2 including a compression spring surrounding the shaft, one end of the spring pressing against the end of the collar opposite the end engaging the bearing, and the other end of the spring pressing against the other of the bearings.

4. A motor as defined in claim 1 wherein the shaft has an axial bore extending from one of its ends, and a radial slot extending from the bore to the exterior of the shaft, the locking member extending from within the bore, through the slot, to a point radially outwardly of the shaft.

5. A motor as defined in claim 4 including a plug within the bore abuting the end of the locking member located within the bore.

6. A motor as defined in claim 5 including means for adjusting the position of the plug along the length of the bore.

7. A motor as defined in claim 5 wherein the bore and plug are threadably cooperative, whereby rotation of the plug moves it along the length of the bore.

8. A motor as defined in claim 6 including an inclined surface within the shaft extending from the bore to the slot, one end of the locking member being slidable along the inclined surface as the plug is moved into the bore, the inclined surface guiding that end of the locking member from within the bore radially outwardly through the slot.

9. A motor as defined in claim 4 including a collar surrounding the shaft in the region of the slot, the end of the locking member located outwardly of the shaft engaging the interior of the collar.

10. A motor as defined in claim 8 wherein the bore extends to the end of the shaft opposite the end fixed to the support, the interior of the bore being screw threaded, and an externally threaded plug within, and threadably engaging, the bore.

* * * * *